May 7, 1940.  W. P. SCHMITTER  2,200,101
VARIABLE SPEED TRANSMISSION
Filed Oct. 2, 1937
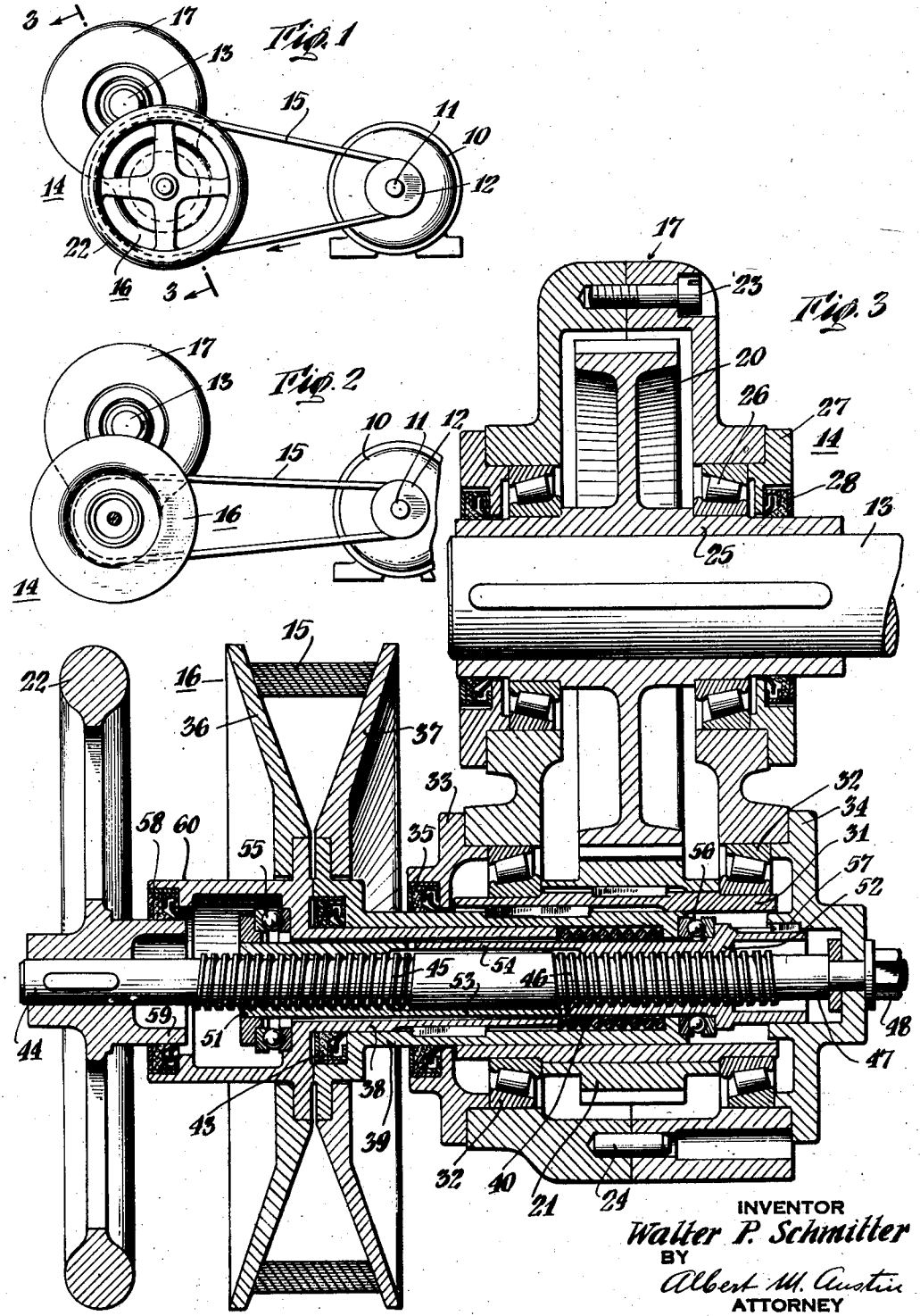
INVENTOR
*Walter P. Schmitter*
BY
*Albert M. Austin*
ATTORNEY Patented May 7, 1940

2,200,101

UNITED STATES PATENT OFFICE 2,200,101

VARIABLE SPEED TRANSMISSION

Walter P. Schmitter, Milwaukee, Wis., assignor to Richard L. Woodhouse, Melbourne, Victoria, Australia Application October 2, 1937, Serial No. 166,962

5 Claims. (Cl. 74—230.17)

The invention relates to power transmissions and, more particularly, to such transmissions using variable diameter belt pulleys.

In order to vary the speed ratio between belt-connected shafts, variable diameter pulleys are sometimes used. If a variable diameter pulley is used on one shaft only, it is necessary to provide for lateral adjustment of one of the shafts to correspond with the change in the diameter of the pulley. Since the driving and driven shafts are in fixed position, it is often inconvenient, if not impossible, to provide for shifting one of the shafts. To avoid this disadvantage, two variable diameter pulleys are sometimes used, one on the driven shaft and one on the drive shaft. Here, when it is desired to change the speed ratio between shafts, the effective diameter of one pulley is increased to correspond with the decrease in the effective diameter of the other pulley.

The present invention contemplates a construction for conveniently overcoming the above disadvantages. With the present invention, it is only necessary to use one variable diameter pulley and it is not necessary to change the positions of the driving or driven shafts. In addition to these advantages, the present construction acts as a gear reduction unit and as an automatic belt tightener.

According to one form which the invention may take, a spur gear is mounted upon one of the fixedly positioned shafts, as for example, the driven shaft. Mounted to swing about this shaft is an arm or housing in which is journalled a pinion meshing said gear. The variable diameter pulley is mounted on the same shaft with said pinion. Thus, the center of the pulley is free to swing about the center of the driven shaft. The driving action of the belt automatically causes the pinion to creep around the spur gear to automatically keep the belt in proper tension. This swinging movement of the pulley and spur gear about the driven shaft also conveniently takes up any increase or decrease between belt centers due to adjustment in the diameter of the belt pulley.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a side elevation illustrating somewhat diagrammatically a belt drive utilizing the transmission according to the invention;

Fig. 2 is a view similar to Fig. 1 showing the changes in the transmission due to decrease in the effective diameter of the pulley; and Fig. 3 is a section taken on the line 3—3 of Fig. 1 illustrating in detail the construction of the transmission.

In the following description and in the claims, various details will be identified by specific names for convenience, but they are intended to be as generic in their application as the art will permit.

Like reference characters denote like parts in the several figures of the drawing.

In the drawing accompanying and forming part of this specification, certain specific disclosure of the invention is made for purposes of explanation, but it will be understood that the details may be modified in various respects without departure from the broad aspect of the invention.

Referring now to Fig. 1, the drive shaft is illustrated by 11. This shaft may conveniently be the shaft of an electric driving motor 10 and the shaft may have mounted thereon a fixed diameter drive pulley 12. It will be understood that this drive pulley will be V-shaped in section to accommodate the drive belt, the construction being similar to that of driven pulley 16 except that it is not adjustable.

The driven shaft is indicated by 13 and is connected to any load met with in industrial use. It will be understood that the positions of shafts 11 and 13 are fixed. The combined belt tightening and adjustable pulley unit is indicated by 14. This unit is supported upon the driven shaft 13 and carries an adjustable diameter pulley 16 over which the belt 15 runs.

Referring now more particularly to Fig. 3, the unit 14 comprises essentially a housing 17, a spur gear 20 mounted upon the driven shaft 13, a pinion 21, a variable diameter pulley 16 mounted on the same shaft with the pinion 21, and an adjustable hand wheel 22. It will be understood that the hand wheel 22 is relatively stationary and does not rotate with the gears or pulleys and that the unit 14 is free to swing about the driven shaft 13 as a center to take up the slack due to adjustment of the pulley diameter and to keep the belt in proper tension.

The housing 17 is split into halves connected by conventional bolts 23 and pins 24. The gear 20 has a long hub 25 suitably keyed to shaft 13. The housing 17 is journalled in roller bearing assemblies 26 mounted upon the hubs 25. The ends of the bearings are closed by plates 27 having suitable oil seal assemblies 28. The plates 27 are secured to the housing by suitable bolts or other devices (not shown).

The drive pinion 21 is keyed or otherwise secured to sleeve 31, the pinion being in continuous mesh with gear 20. The sleeve 31 is journalled in roller bearing assemblies 32 which are closed by end plates 33 and 34 suitably secured to the housing by bolts (not shown). The plate 33 is provided with an oil seal assembly 35.

The adjustable pulley 16 is made up of conical halves 36, 37 fixedly mounted on sleeves 38 and 39. The sleeves 38 and 39 are feather-keyed together and the sleeve 39 is also feather-keyed to pinion sleeve 31. A coil spring 40 is located between the ends of telescoping sleeves 38 and 39 and an oil seal assembly 43 is provided between the sleeves.

The hand wheel 22 is relatively stationary during the operation of the transmission. It is secured to a screw shaft 44 having machine screw parts 45 and 46 threaded in opposite directions. the end of screw shaft 44 is journalled in end plate 34, the end plate being held between shoulder 47 on the shaft and a nut 48.

Threaded on the screw threads 45 and 46 are sleeve nuts 51 and 52 having axially extending splines 53, 54 which interfit together to prevent relative rotation of the sleeve nuts while permitting relative axial movement of these parts. Ball bearing assembly 55 is provided between shoulders on nut sleeve 51 and sleeve 38, and a ball bearing assembly 56 is similarly provided between shoulders on nut sleeve 52 and sleeve 39. These ball bearing assemblies take the end thrust caused by the helical spring 40 acting between telescoping sleeves 38 and 39.

It will be seen that the adjusting assembly made up of hand wheel 22, screw shaft 44 and nut sleeves 51 and 52 are journalled within the rotating assembly made up of telescoping sleeves 38 and 39 attached to the pulley halves 36, 37. A non-rotatable connection indicated by 57, which may be a feather-keyway arrangement, is provided between nut sleeve 52 and end plate 34. This connection permits relative axial movement of the nut sleeve 52 with respect to end plate 34, but does not permit any rotating movement between these parts.

The oil seal assembly 58 is provided between a hub 59 on hand wheel 22 and a hub 60 on sleeve 38, and prevents leakage of oil at this point. It will be understood that the housing 17 is filled with suitable lubricant to a proper level for lubricating the gears, the several bearing assemblies and the other parts between which there is mechanical movement.

It will be understood that the various constructions permitting relative longitudinal movement between parts without rotational movement are shown purely for purposes of illustration. Obviously, similar well known constructions may be used in place of the feather-keyway arrangements shown in the drawing.

It will be seen that the belt 15 has a tapered cross section which fits the V-shaped section of the adjustable pulley 16. To decrease the effective diameter of this pulley, the hand wheel 22 is turned which separates the nut sleeves 51 and 52. The spring 40 operates to separate the telescoping sleeves 38 and 39 to hold them against the bearing assemblies 55, 56, thereby separating the pulley sections 36, 37. These sections separate permitting the belt 15 to engage a smaller effective diameter. However, the angle of engagement between the belt 15 and the sections 36, 37 does not change so the belt continues to ride properly, but at a smaller effective diameter. To adjust the pulley to a larger diameter, the hand wheel 22 will be rotated in the opposite direction and the cycle of events above described will be reversed.

As the belt rotates in the direction of the arrow in Fig. 1, the load torque causes the pinion 21 to tend to climb around on gear 20 away from drive shaft 11. This force is resisted by the belt 15, thus keeping the belt under tension. The higher the load torque, the more tension is imparted to the belt. Thus, the device operates as an automatic belt tightener, this action cooperating with the wedging action between the belt and the pulley grooves to reduce slipping.

The freedom of the adjustable belt pulley to swing about the driven shaft 13 facilitates adjustment of the speed ratio between driving and driven shafts. It is only necessary to turn the hand wheel 22 which may be done without stopping the machinery, and the swing of the adjustable pulley about the driven shaft 13 takes up any increase or decrease in distance between pulley centers caused by change in the effective diameter of the adjustable pulley.

It will be understood that the invention is applicable to multiple belt adjustable pulleys in which a hand wheel similar to 22 simultaneously adjusts the diameter of several coaxially mounted adjustable pulleys. The invention is also adapted for use with other types of adjustable pulleys. For example, it is applicable to adjustable pulleys made up of stepped, fixed pulley sections of different diameters. In this case, the belt must be transferred from one section to another to obtain change in speed ratio. Furthermore, the combined belt tightening and adjustable speed unit may be placed upon the drive shaft instead of the driven shaft as shown.

Thus, a construction is provided which provides an adjustable speed ratio between driving and driven shafts. It provides a step down or step up in speed, depending upon whether the unit 14 is mounted upon driven shaft 13 or upon drive shaft 11. The belt may be easily positioned or removed when the machine is stopped as all tension is removed at that time. The pulley diameter is adjustable while the machine is in motion. The automatic belt tension and the V-shaped groove construction cooperate to prevent belt slippage. The center line of the adjustable pulley remains fixed independent of adjustment due to the axial positioning of the screw bolt 44.

While certain novel features of the invention have been disclosed and are pointed out in the annexed claims, it will be understood that various omissions, substitutions and changes may be made by those skilled in the art without departing from the spirit of the invention.

What is claimed is:

1. In a power transmission, a combined belt tightener and variable diameter change speed unit comprising a main gear adapted to be fixed to a main shaft, an arm mounted to swing about said main shaft as a center, a pinion meshing with said gear, a hollow shaft carrying said pinion and journalled in said arm, a pulley secured to said hollow shaft and comprising separable conical sections forming a V-shaped groove, and means disposed at least partially within said hollow shaft for adjusting said sections to provide different effective pulley diameters.

2. In a power transmission, a variable diameter change speed unit comprising a main sleeve adapted to be fixed to a main shaft, a gear fixed to said main sleeve, a housing having bearings on said main sleeve on opposite sides of said gear, a pinion meshing with said gear, bearings in said housing on opposite sides of said pinion, a hollow shaft carrying said pinion and journalled in said bearings, a pulley comprising separable conical sections forming a V-shaped groove, a pair of sleeves secured to said sections, a pair of interlocking, axially adjustable nut members having thrust bearings engaging said sleeves, a screw member having oppositely disposed threads engaging said nut members, a hand wheel on said screw member, means connecting said sleeves to said hollow shaft, and means fixing the axial position of said screw member.

3. In a variable speed transmission, a first main shaft having a gear affixed thereto, an arm mounted to swing about said shaft as a center, a gear journalled on said arm and meshing with said first gear, a variable diameter adjustable V-pulley journalled on said arm and secured to said second gear, a second main shaft having a fixed diameter V-pulley and a V-belt connecting said pulleys, whereby the speed ratio between said pulleys may be varied without changing the position of said main shafts, said arm being free to swing during operation of the transmission, said belt rotating in such direction that the torque keeps said belt tight, irrespective of the adjustment of said variable diameter pulley.

4. In a power transmission, a combined belt tightener and variable diameter change speed unit comprising a main sleeve adapted to be fixed to a main shaft, a gear fixed to said main sleeve, a housing having bearings on said main sleeve on opposite sides of said gear, a pinion meshing with said gear, bearings in said housing on opposite sides of said pinion in which said pinion is journalled, a pulley comprising separable conical sections forming a V-shaped groove, a pair of telescoping inner and outer sleeves secured to said sections, a pair of interlocking, axially adjustable nut members, said nut members having abutments at the outer sides of said sleeves respectively, thrust bearings between said abutments and said sleeves, a screw member having oppositely disposed threads engaging said nut members, a hand wheel on said screw member, a bearing between said screw member and said housing to determine the axial position of said screw member, a helical spring operating between said telescoping sleeves to urge said sleeves against said thrust bearings, said outer sleeve having engagement with said pinion and with said inner sleeve to permit relative axial movement but no relative rotary movement.

5. In a power transmission, a combined belt tightener and variable diameter change speed unit comprising a main sleeve adapted to be fixed to a main shaft, a gear fixed to said main sleeve, a housing having bearings on said main sleeve on opposite sides of said gear, a pinion meshing with said gear, a pinion sleeve secured to said pinion, bearings between said pinion sleeve and said housing on opposite sides of said pinion, a pulley comprsing separable conical sections forming a V-shaped groove, a pair of inner and outer telescoping sleeves secured to said sections, a pair of interlocking, axially adjustable, axially disposed nut members, said nut members having abutments on the outer sides of said telescoping sleeves respectively, thrust bearings between said abutments and said telescoping sleeves, a screw member having oppositely disposed threads engaging said nut members, a hand wheel on said screw member, a bearing between said screw member and said housing, a helical spring operating between said telescoping sleeves to urge said sleeves against said thrust bearings, said outer sleeve having engagement with said pinion sleeve and with said inner sleeve to permit relative axial movement but no relative rotary movement, said telescoping sleeves, said nut sleeves and said spring being located within said pinion sleeve.

WALTER P. SCHMITTER.